United States Patent
Smith, Jr. et al.

(10) Patent No.: US 6,464,050 B2
(45) Date of Patent: Oct. 15, 2002

(54) MAGNETO-RHEOLOGICAL STEERING DAMPER

(75) Inventors: Ronald Gene Smith, Jr., New Carlisle, OH (US); Michael Leslie Oliver, Xenia, OH (US); William Charles Kruckemeyer, Beavercreek, OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/821,870

(22) Filed: Mar. 30, 2001

(65) Prior Publication Data

US 2002/0140145 A1 Oct. 3, 2002

Related U.S. Application Data

(60) Provisional application No. 60/245,979, filed on Nov. 3, 2000.

(51) Int. Cl.[7] .................................................. F16F 9/53
(52) U.S. Cl. ................................................... 188/267.1
(58) Field of Search ............................ 188/267.1, 267.2

(56) References Cited

U.S. PATENT DOCUMENTS

| | | | | | |
|---|---|---|---|---|---|
| 2,695,675 A | * | 11/1954 | Frye | ........................ | 188/267.1 |
| 4,123,675 A | * | 10/1978 | Moskowitz et al. | ..... | 188/267.1 |
| 4,896,754 A | * | 1/1990 | Carlson et al. | .......... | 188/267.1 |

* cited by examiner

Primary Examiner—Matthew C. Graham
(74) Attorney, Agent, or Firm—Scott A. McBain

(57) ABSTRACT

A vibration damper assembly to dampen the vibration generated in a motor vehicle and transmitted through, for example, a steering assembly. The vibration damper assembly includes a rotor disposed within a housing. The rotor is operatively connected to a velocity generating member such as a pinion that is integrated with the steering assembly. A conductive sleeve is disposed between the housing and the rotor. A coil engages the sleeve and is capable of generating a magnetic field that is transmitted through the sleeve. A plate separates the rotor from the sleeve thereby defining a viscous fluid chamber and a Magneto-Rheological (MR) fluid chamber between the rotor and the sleeve. The viscous fluid chamber includes a Newtonian fluid and the MR fluid chamber includes a MR fluid having sheer properties reactive to the magnetic field.

13 Claims, 5 Drawing Sheets

MAGNETO-RHEOLOGICAL STEERING DAMPER

CROSS-REFERENCE TO RELATED APPLICATIONS

This application claims the benefit of U.S. Provisional Patent Application Ser. No. 60/245,979, filed Nov. 3, 2000.

TECHNICAL FIELD

The subject invention relates generally to vibration damping of suspension and steering systems in a motor vehicle. More specifically, the subject invention relates to vibration damping using viscous sheer and magneto-rheological clutching.

BACKGROUND OF THE INVENTION

Rotary dampers have been installed in both steering and suspension assemblies of motor vehicles to dampen the amount of vibration detected by the vehicle operator from such variables as vehicle speed, road bumps, wheel alignment, wheel chatter, and tread wear. Rotary dampers of this type reduce the amount of vibration transferred to the vehicle operator by resisting rotational velocity generated from a pinion associated with either the steering assembly or the suspension assembly. The rotational velocity is resisted by torque generated by the rotary damper thereby reducing vibration. The torque is derived from a clutch-like resistance generated by a fluid, having a Newtonian behavior, when a rotor disposed within the vibration damper assembly is operatively connected to the pinion and receives rotational velocity from the pinion.

The rotational velocity generated by the pinion connected to the rotary damper varies with the amount of vibration absorbed from the operating variables listed above. A different level of torque is required to provide uniform dampening at high rotational velocities than at low rotational velocities. A Newtonian fluid provides adequate torque at low rotational velocity, however, at high rotational velocities, too much torque is provided by the Newtonian fluid, which reduces the effectiveness of the rotary damper.

Therefore, it would be desirable to provide a rotary damper having variable torque capabilities that would optimize the amount of vibration damping at both low and high rotational velocity.

SUMMARY OF THE INVENTION

The present invention discloses a vibration damper assembly for reducing the amount of vibration transferred to a motor vehicle operator from variables such as vehicle speed, road bumps, wheel alignment, wheel chatter, and tread wear.

The assembly includes a rotor disposed within a housing. The rotor is operatively connected to a rotational velocity generating member, such as a pinion, that is connected to a steering or suspension assembly. A conductive sleeve is positioned between the housing and the rotor. A coil is positioned adjacent the sleeve and is capable of generating a magnetic field that is transmitted through the sleeve. An annular plate separates the rotor from the sleeve and defines a viscous chamber and a Magneto-Rheological (MR) fluid chamber. The viscous chamber is disposed between the sleeve and the housing and the MR chamber is disposed between the sleeve and the rotor. A viscous fluid is contained within the viscous chamber and an MR fluid is contained within the MR chamber. The viscous fluid behaves as a Newtonian fluid throughout operation of the assembly. The MR fluid behaves as a Bingham plastic when it is subjected to the magnetic field and otherwise, behaves as a Newtonian fluid.

The subject concept overcomes the deficiencies of the prior art by providing the ability to vary the amount of torque generated by the vibration damper assembly. When not subjected to the magnetic field, the torque is generated by a Newtonian fluid, which is preferable at low velocity. When subjected to the magnetic field, the MR fluid is transformed from a fluid having Newtonian characteristic to a fluid having Bingham plastic characteristics, which generates a torque that is preferable at higher velocities.

DESCRIPTION OF THE PREFERRED EMBODIMENT

Figure 1:
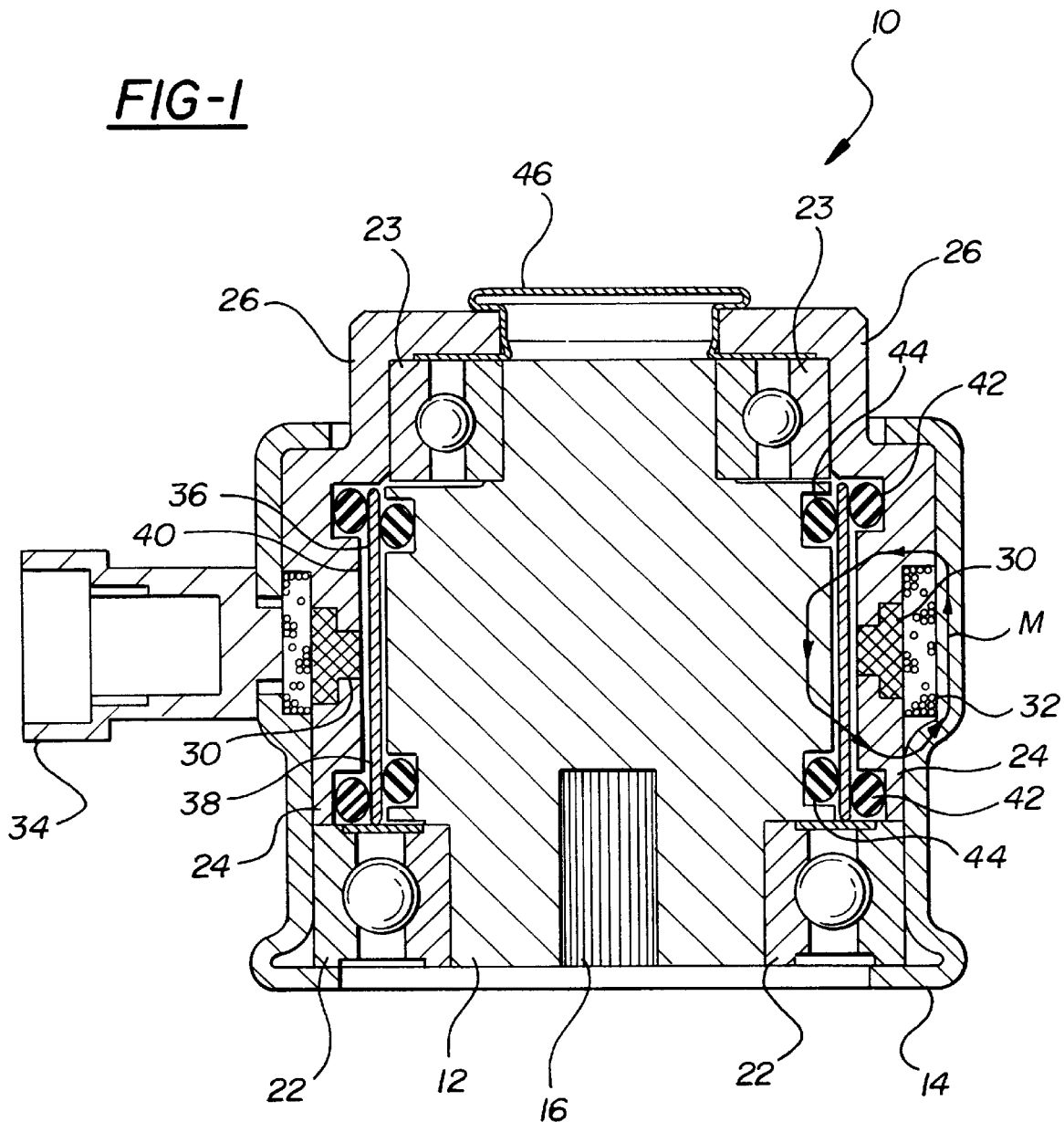
FIG. 1 is a sectional view of the vibration damper assembly of the present invention.

Referring to FIG. 1, a vibration damper assembly is generally shown at 10. The assembly 10 utilizes magneto-rheological fluid in combination with a Newtonian fluid to reduce the vibration associated with, for example, rack and pinion steering systems commonly installed in motor vehicles. The assembly 10 can also be installed in other systems, such as, for example a vehicle suspension system.

Figure 2:
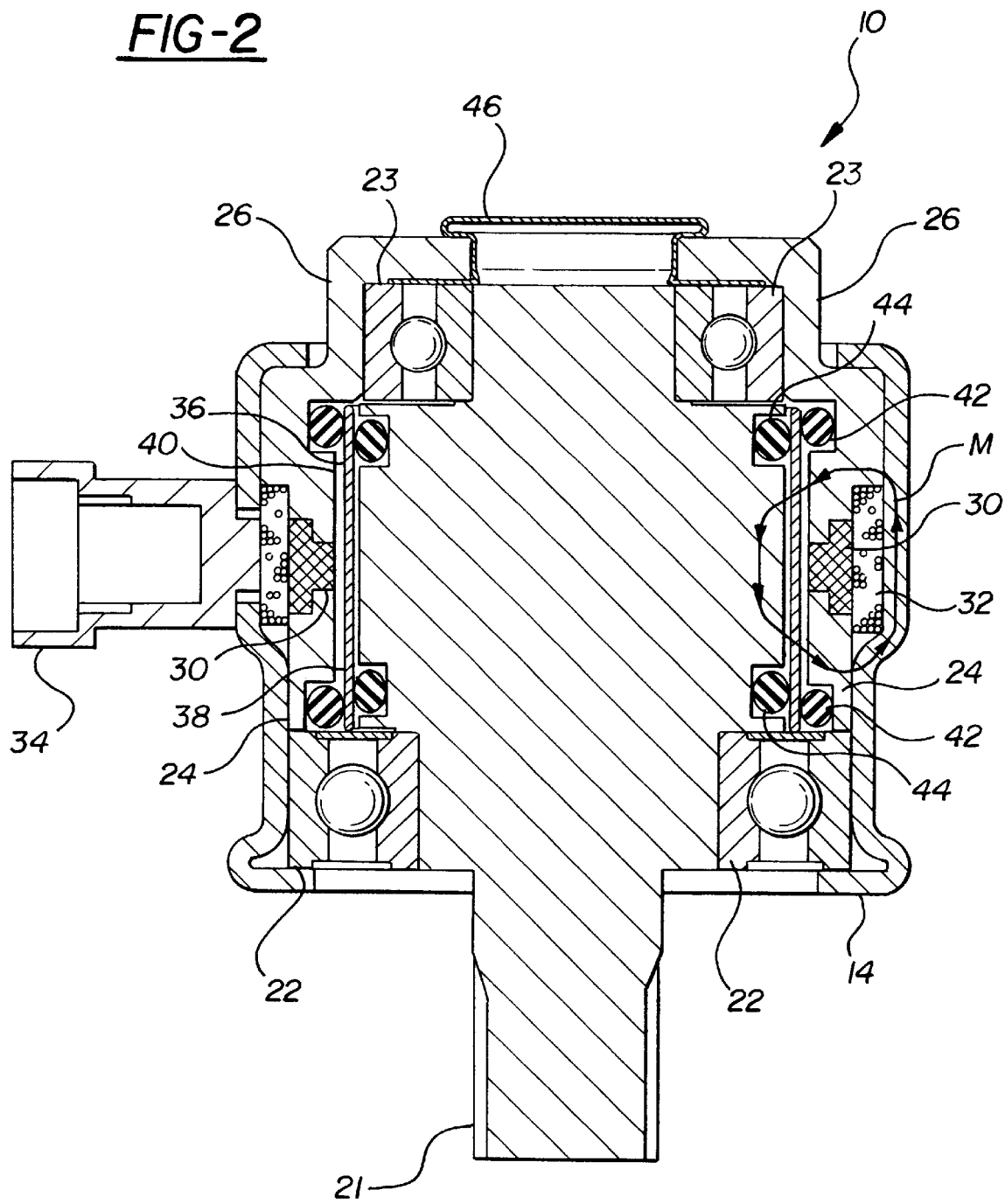
FIG. 2 is a sectional view of an alternative embodiment of the vibration damper assembly of the present invention.
Figure 4:
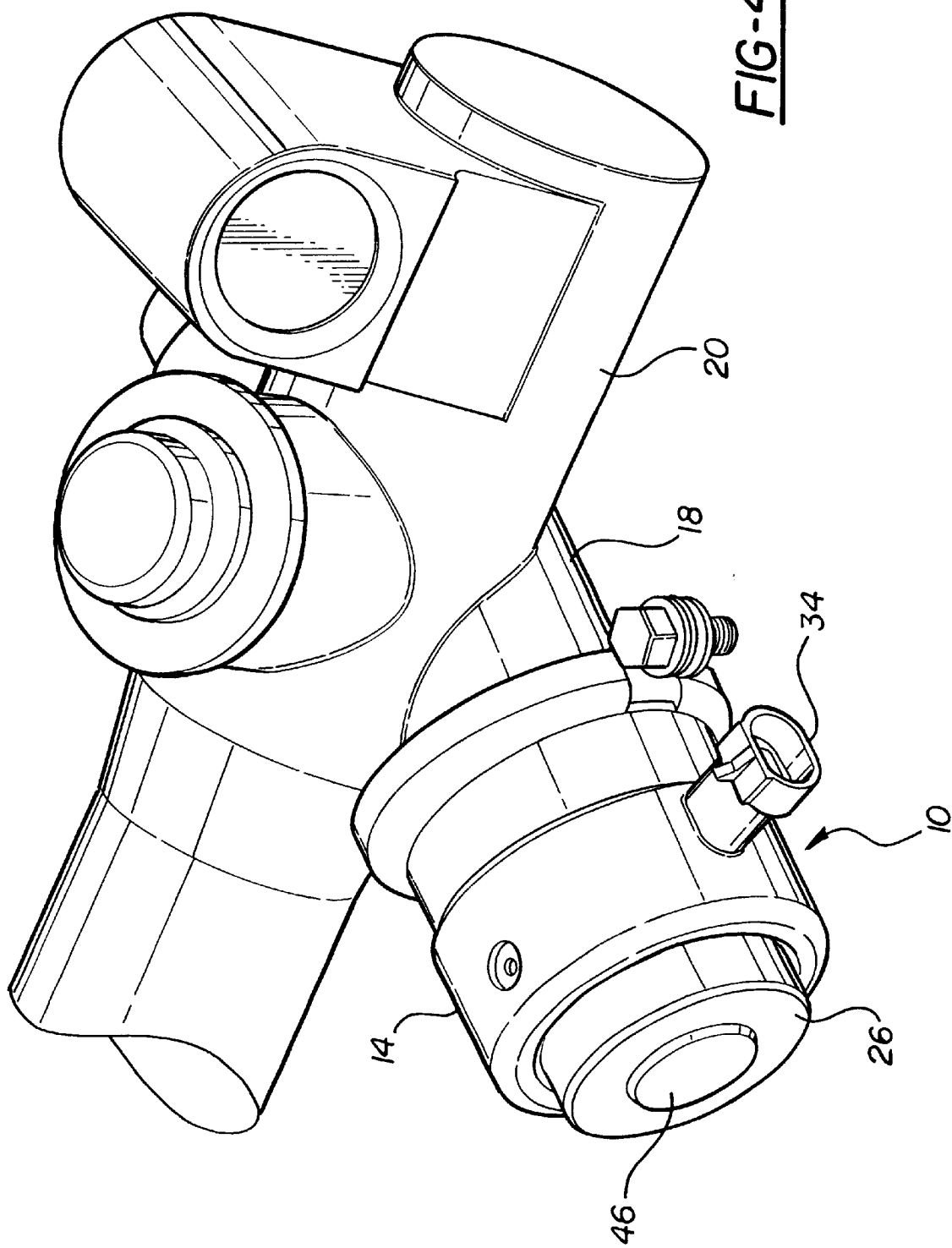
FIG. 4 is perspective view of a rack and pinion steering assembly showing the vibration damper assembly of the present.

A rotor 12 is centrally located within an assembly housing 14. The rotor 12 includes a spline 16 for receiving a distal end of a pinion 18 from a steering gear 20 (FIG. 4). Alternatively, as shown in FIG. 2, the rotor 12 can include a shaft 21 for engaging a steering pinion. A first plurality of bearing assemblies 22 and a second plurality of bearing assemblies 23 align the rotor 12 inside the housing 14 allowing the rotor 12 to pivot with the pinion relative to the housing 14.

A first polar ring 24 and a second polar ring 26 are positioned between the housing 14 and the rotor 12. The first polar ring 24 abuts the first plurality of bearings 22 but does not interfere with the interaction between the first plurality of bearings 22, with the rotor 12 and the housing 14. The second polar ring 26 protrudes through the housing 14 at an end opposite the spline 16. The polar rings 24, 26 are preferably formed from an annealed mild steel and readily conduct magnetic fields. The second plurality of bearings 23 is positioned between the second polar ring 26 and the rotor 12 allowing the rotor 12 to pivot with the spline 16 relative to the second polar ring 26. The first polar ring 24 does not contact the rotor and therefore does not require any bearings to separate it from the rotor 12 as will be further evident below.

A non-magnetic insert 30 connects the first polar ring 24 to the second polar ring 26 forming a sleeve capable of conducting separate magnetic fields. The preferable method for connecting the non-magnetic insert 30 to the polar rings 24, 26 is by brazing. However, other methods of connection may be used if desired. The non-magnetic insert 30 insulates each polar ring 24, 26 from the other. Therefore, the first polar ring 24 can have a different magnetic potential than the second polar ring 26 depending upon the direction of a magnetic field contacting each of the rings 24, 26.

A coil 32 overlays the non-magnetic insert 30 and contacts both the first and second polar rings 24, 26. The coil 32 is attached to an electrical connector 34. When receiving an electrical current via the electrical connector 34 the coil 32 generates a magnetic field M. As represented in FIG. 1, the magnet field M travels in different directions through each of the polar rings 24, 26. The magnetic field M therefore magnetizes one of the polar rings 24, 26 with a Northern bias and the other of the polar rings 24, 26 with a Southern bias. Because the non-magnetic insert 30 insulates the first polar ring 24 from the second polar ring 26 different poles are established in each polar ring 24, 26.

A sleeve 36 encircles the rotor 12 between the bearings 22, 28. The sleeve 36 is positioned between the rotor 12 and the first and second polar rings 24, 26 forming an inner chamber 38 with the rotor 12 and an outer chamber 40 with the polar rings 24, 26. The sleeve 36 may include magnetic or non-magnetic properties depending upon the strength requirements of the magnetic field M. If a low level magnetic field is required, a non-magnetic sleeve is utilized. If a high level magnetic field is required, a conductive sleeve is utilized. A magneto-rheological (MR) fluid fills the inner chamber 38 and a viscous fluid fills the outer chamber 40.

Figure 3:
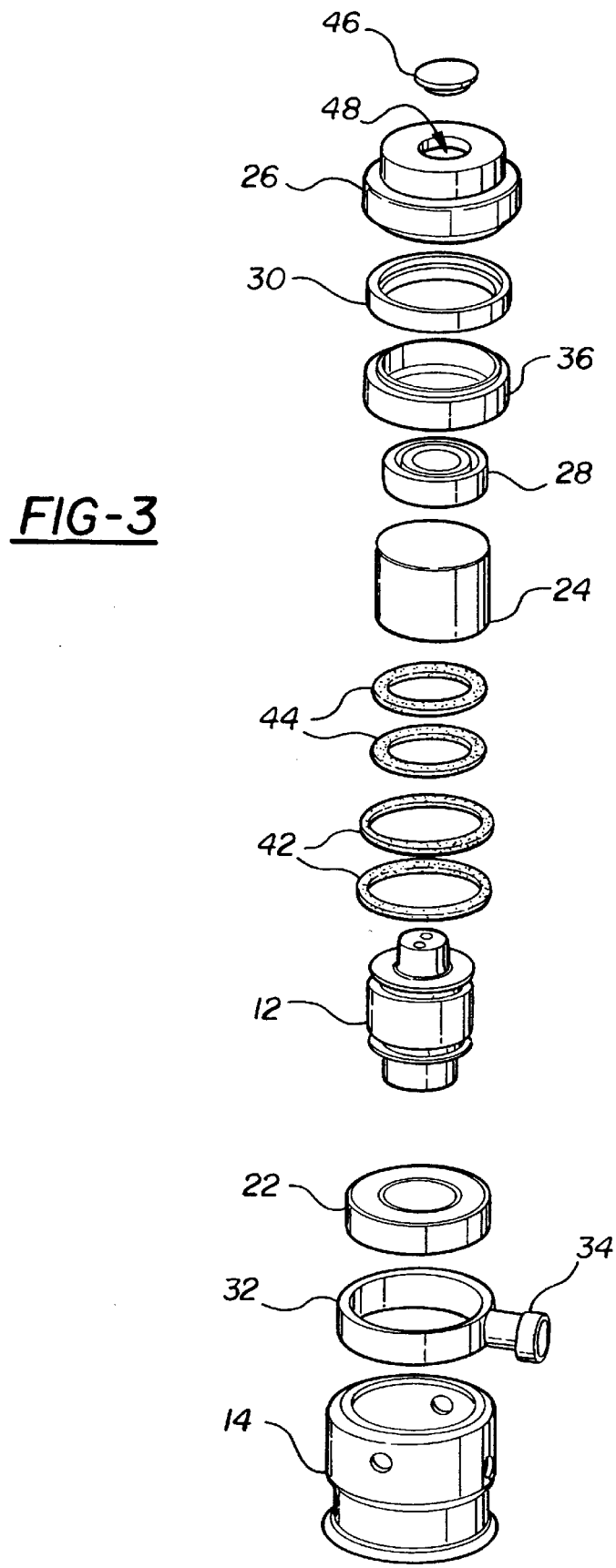
FIG. 3 is an exploded view of the vibration damper assembly of the present invention.

The sleeve 36 is centered between upper and lower outer seals 42 and upper and lower inner seals 44. The outer seals 42 retain the viscous fluid in the outer chamber 40 and the inner seals retain the MR fluid in the inner chamber 38. A plug 46 seals an aperture 48 (FIG. 3) in the rotor 12 to prevent the assembly 10 components from being contaminated from environmental elements.

The MR fluid retains Newtonian shear characteristic when not subjected to the magnetic field M. The viscous fluid retains Newtonian properties throughout operation of the assembly 10. When subjected to the magnetic field M generated by the coil 32, the yield stress of the MR fluid increases and stabilizes establishing sheer characteristics of a Bingham plastic.

Referring to FIG. 4, rotational velocity is generated by the pinion 18, and transferred to the rotor 12, by a number of different vehicle operating variables. The variables include vehicle speed, road bumps, wheel alignment, wheel chatter, tread wear and others. The rotational velocity is transferred through the steering column (not shown) to the driver in the form of vibration when the rotational velocity is not damped. The assembly 10 uses torque generated by viscous and sheer forces between the rotor 12, the sleeve 36 and the polar rings 24, 26 to damp the vibration. Resistance to the rotational velocity of the rotor 12 in the form of torque is generated from the MR and viscous fluids.

Figure 5:
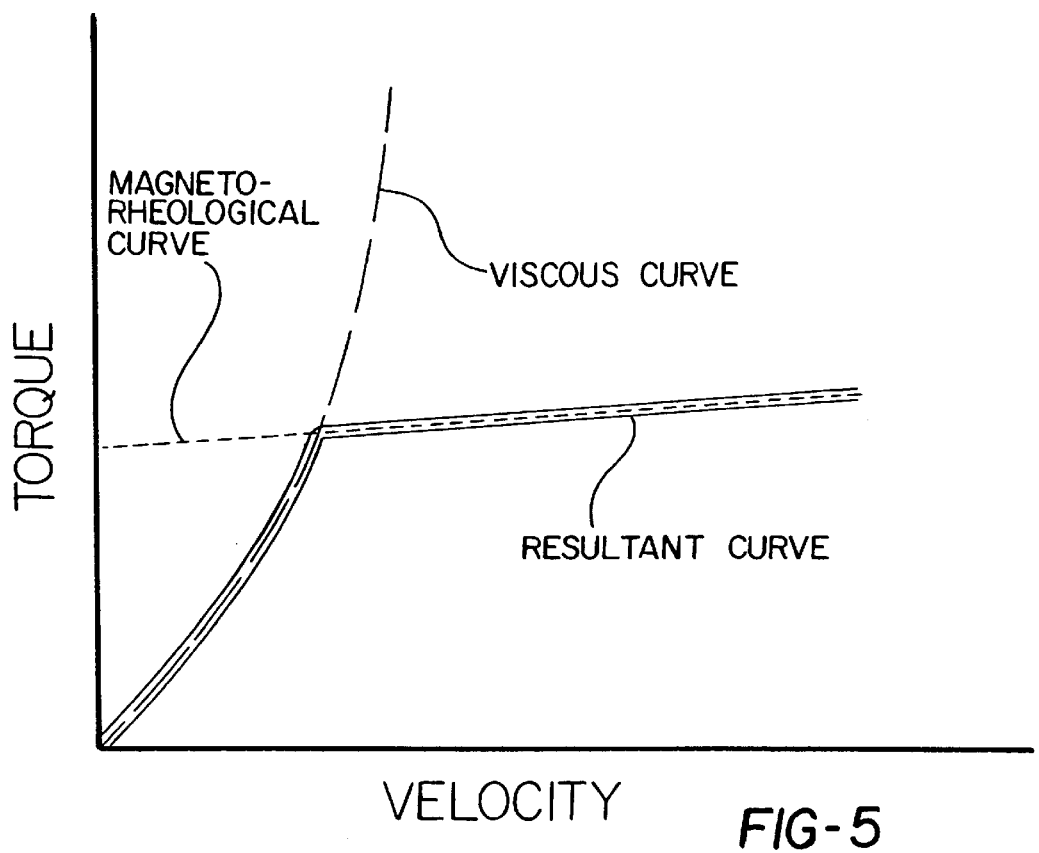
FIG. 5 is a graph showing the relation between torque and velocity for the fluids used in the vibration damper assembly.

The rotation resisting torque generated in the rotor 12 dampens the vibrations derived from the rotational velocity of the pinion 18. The resisting torque generated by each fluid is applied to the other fluid so that the lesser torque is the effective torque of the assembly 10. When the coil 32 is not energized, the MR fluid generates a torque in the inner chamber 38 low enough to allow the rotor 12 to turn freely. When the coil 32 is energized, the torque generated in the assembly 10 is a combination of both the viscous fluid and the MR fluid as shown in FIG. 5. At low velocity, the torque generated is primarily from the viscous fluid and, therefore, follows the viscous curve. At higher velocities, the magnetic field is energized. Thus, the torque generated is primarily from the MR fluid, and, therefore, follows the MR curve. If, at high velocities, the viscous fluid generates the entire torque, an unfavorable high level of motion would be generated allowing vibration to be transferred through the steering column. By activating the MR fluid at high velocities, a more uniform level of damping is achieved.

Figure 6:
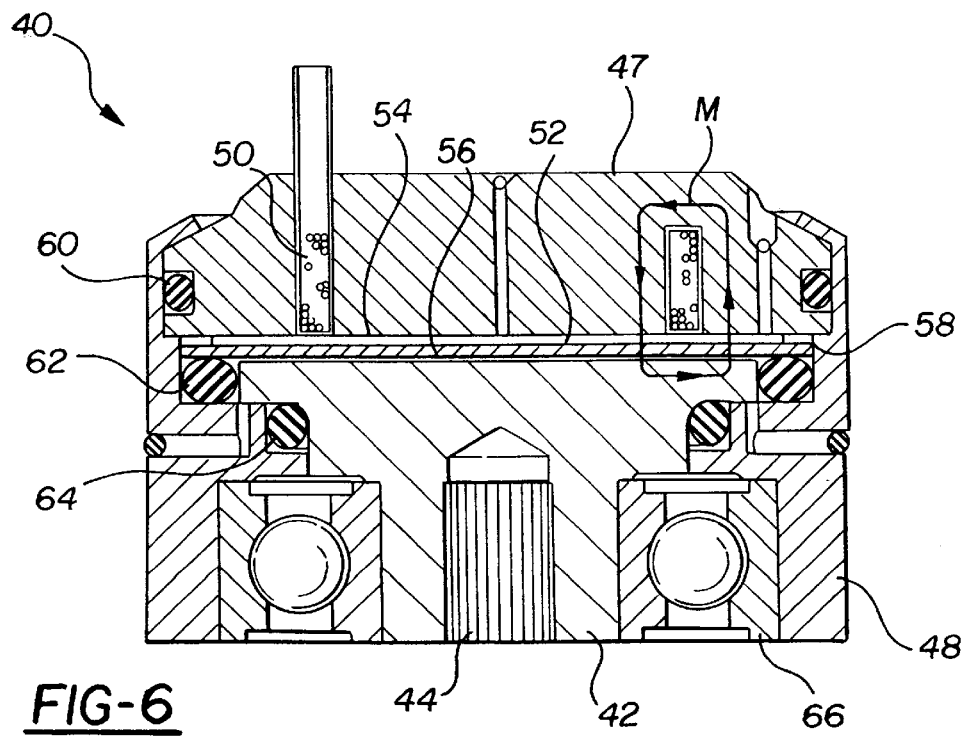
FIG. 6 is a sectional view of an alternative embodiment of the vibration damper assembly.

FIG. 6 shows an alternative embodiment as a plate style damper assembly generally at 40. A plate rotor 42 receives a pinion (not shown) with a spline 44. A conductive core 47 protrudes through a housing 48 that encloses the components of the assembly 40. Disposed within the core 46 is an electric coil 50, which when conducting electricity generates a magnetic field represented as M. A plate 52 is positioned between the plate rotor 42 and the magnetic core 46 forming a first chamber 54 and a second chamber 56. Viscous (Newtonian) fluid is disposed within the first chamber 54 and MR fluid is disposed within the second chamber 56. A spacer 58 separates the plate 52 from the conductive core 46 to maintain enough space in the first chamber 54 to hold the viscous fluid.

A core O-ring 60 seals the viscous fluid inside the upper chamber 54. A first and second rotor O-ring 62, 64 seal the MR fluid inside lower chamber 56. A plurality of bearings 66 position the plate rotor 42 within the housing 48 allowing the rotor 42 and the pinion to rotate relative to the housing 48. The plate 52 is made of a magnetically inert material, such as, for example stainless steel.

The plate style damper assembly 40 operates much the same as the preferred embodiment (assembly 10). When the coil 50 is not energized, the MR fluid provides relatively little torque to the rotation of the rotor 46. When the coil 50 is energized, the combination of the viscous fluid and the MR fluid provides low damping at lower rotational velocity and damping that levels off at higher rotational velocity as is shown by the curve in FIG. 5.

What is claimed is:

1. A vibration damping assembly comprising:
   a housing;
   a rotor disposed within said housing operatively connected to a rotation generating member;
   a panel with conductive properties positioned adjacent said rotor;
   a coil circumscribing said panel and being capable of carrying an electric current thereby generating a magnetic field through said panel;
   a separating member positioned between said rotor and said panel defining a viscous fluid chamber and a magneto-rheological (MR) fluid chamber between said rotor and said panel wherein viscous fluid is disposed within said viscous fluid chamber and MR fluid is disposed within said MR chamber, said MR fluid having sheer properties reactive to said magnetic field generated by said coil.

2. An assembly as set forth in claim 1 further including a plurality of bearings disposed between said rotor and said housing allowing said rotor to rotate relative to said housing.

3. An assembly as set forth in claim 1 wherein said panel includes a non-magnetic insert defining a first polar ring and a second polar ring within said panel.

4. An assembly as set forth in claim 3 wherein said magnetic field generates a first polar bias in said first polar ring and a second polar bias in said second polar ring.

5. An assembly as set forth in claim 4 wherein said coil is positioned adjacent said non-magnetic member.

6. An assembly as set forth in claim 1 wherein said coil includes an electrical connector connecting said coil to a source of electicity.

7. An assembly as set forth in claim 1 including a pair of outer seals and a pair of inner seals sealing said MR fluid within said MR chamber and said viscous fluid within said viscous chamber.

8. An assembly as set forth in claim 1 wherein said viscous fluid includes Newtonian sheer properties.

9. An assembly as set forth in claim 1 wherein in said coil receives electrical current when said rotor includes a high rotational velocity thereby providing vibration damping torque characteristic of said MR fluid.

10. An assembly as set forth in claim 1 wherein said coil does not receive electrical current when said rotor includes a low rotational velocity thereby providing vibration damping torque characteristic of said viscous fluid having Newtonian sheer properties.

11. An assembly as set forth in claim 1 wherein said separating member comprises a sleeve circumscribing said rotor.

12. An assembly as set forth in claim 1 wherein said separating member comprises a plate having a generally flat profile and being positioned between said rotor and said panel.

13. An assembly as set forth in claim 12 wherein said panel comprises a core with conductive properties and having said coil disposed therein.

* * * * *